Figure 1:
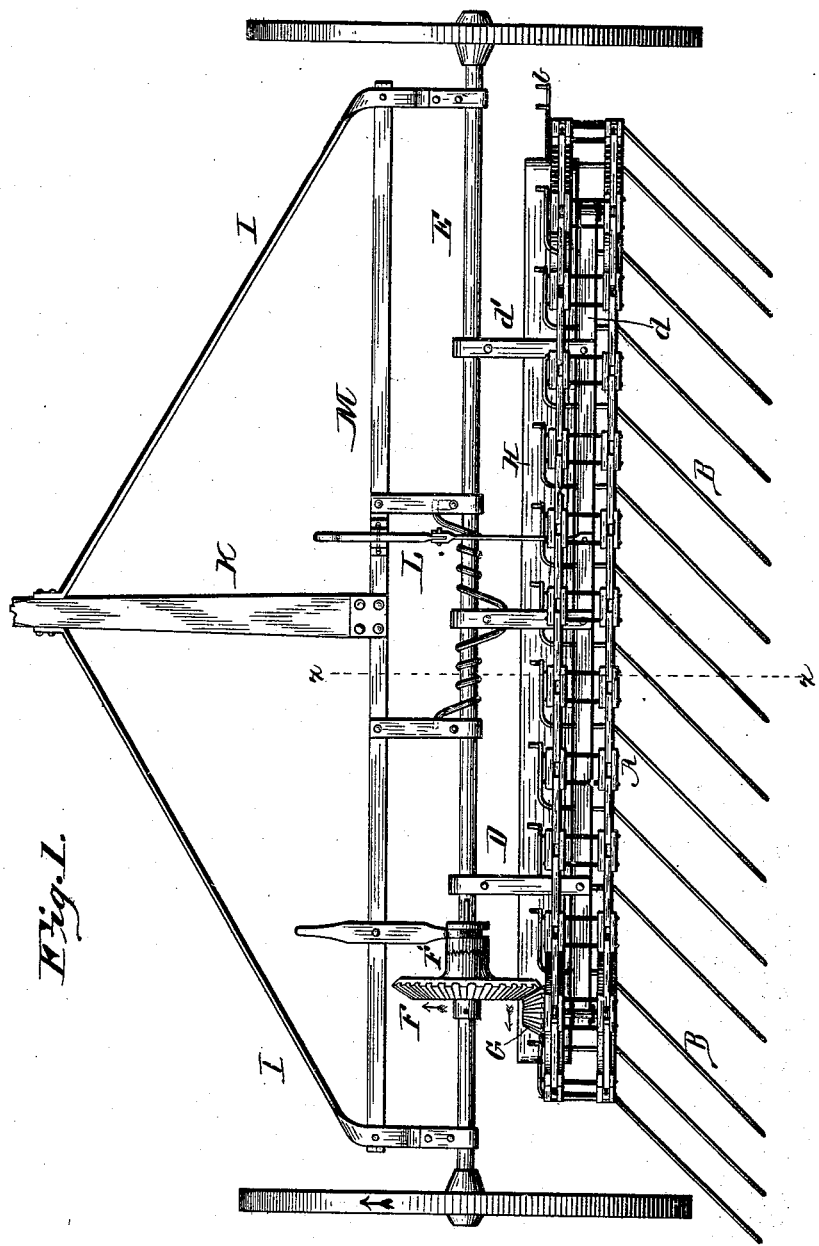

(No Model.)  5 Sheets—Sheet 1.

E. SWIFT.
HORSE HAY RAKE.

No. 479,033.  Patented July 19, 1892.

Witnesses.
W. D. Middleton
M. M. Wagner

Inventor
Ernest Swift
By Chas. G. Page
Atty.

(No Model.) 5 Sheets—Sheet 3.

E. SWIFT.
HORSE HAY RAKE.

No. 479,033. Patented July 19, 1892.

Witnesses
W. H. Middleton
Margaret M. Wagner

Inventor
Ernest Swift
By Chas. G. Page
Atty (No Model.) 5 Sheets—Sheet 4.

E. SWIFT.
HORSE HAY RAKE.

No. 479,033. Patented July 19, 1892.

Witnesses
W. D. Middleton
Margaret M. Wagner

Inventor
Ernest Swift
By Chas. G. Page
Atty

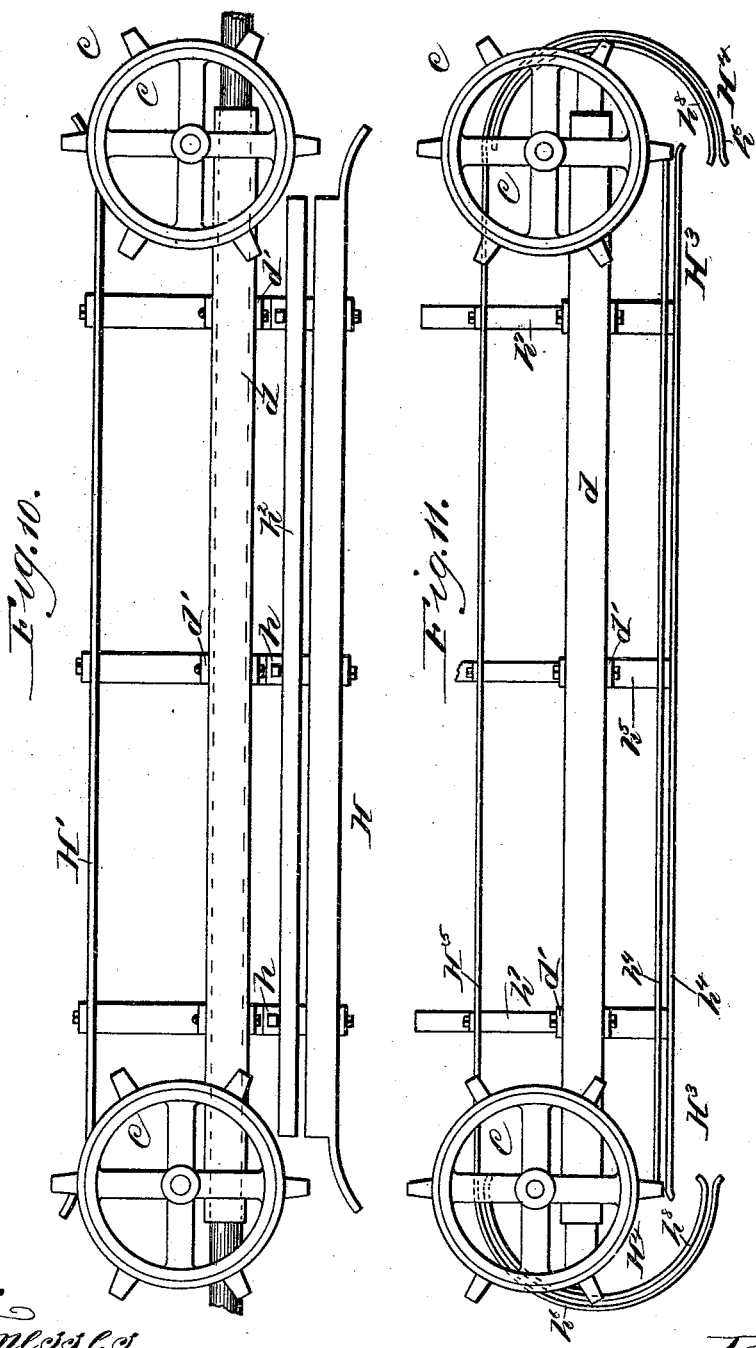

UNITED STATES PATENT OFFICE.

ERNEST SWIFT, OF DE KALB, ILLINOIS.

HORSE HAY-RAKE.

SPECIFICATION forming part of Letters Patent No. 479,033, dated July 19, 1892.

Application filed November 13, 1891. Serial No. 411,810. (No model.)

*To all whom it may concern:*

Be it known that I, ERNEST SWIFT, a citizen of the United States, residing at De Kalb, in the county of De Kalb, in the State of Illinois, have invented a certain new and useful Improvement in Horse Hay-Rakes, of which the following is a specification.

My invention relates to horse hay-rakes in which the teeth are attached to an endless chain or carrier arranged to travel transversely to the line of progression, so as to rake and deposit the hay in a windrow alongside the machine during the advancement of the latter.

The objects of my invention are to insure the formation of a continuous windrow of uniform size; to rake the hay as mown, so that the first hay cut can be conveniently raked first; to equalize the draft; to insure steady and proper raking of the hay and proper positioning of the teeth while they are raking with reference to the advancement of the machine and hay to be raked, and to provide certain novel and improved details serving to generally increase the efficiency and serviceability of horse hay-rakes.

In carrying out my invention I attach the spring rake-teeth to an endless chain or carrier supported to travel transversely to the line of progression of the machine and arrange the teeth so that while raking they shall severally lie in planes oblique to the line of progression and corresponding with the oblique or diagonal line of work, which said lines are the resultants of the advancement of the machine and the motion transversely to such advancement of the endless carrier for the teeth. By such arrangement each tooth may be said to rake directly ahead of itself—that is to say, its lower end or point will move in a line coincident with the vertical plane occupied by the curved portion of the tooth, and hence the hay will be raked as naturally and easily as in hay-rakes in which the teeth are in vertical planes coincident with the line of advancement of the machine. The teeth dump or leave the hay at one side of the machine, so as to form a continuous windrow, and at such point the teeth can, if desired, be swung or tilted away from the windrow by any suitable way and by any suitable means.

For the broader purposes of my invention any known or suitable construction of endless carrier and frame can be employed.

Figure 2:
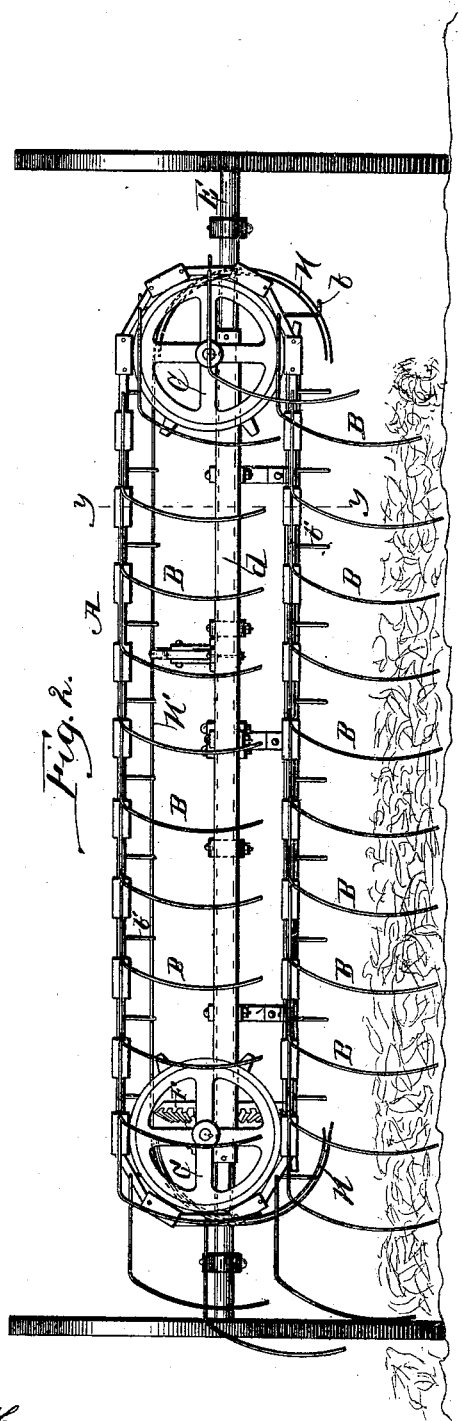
Figure 3:
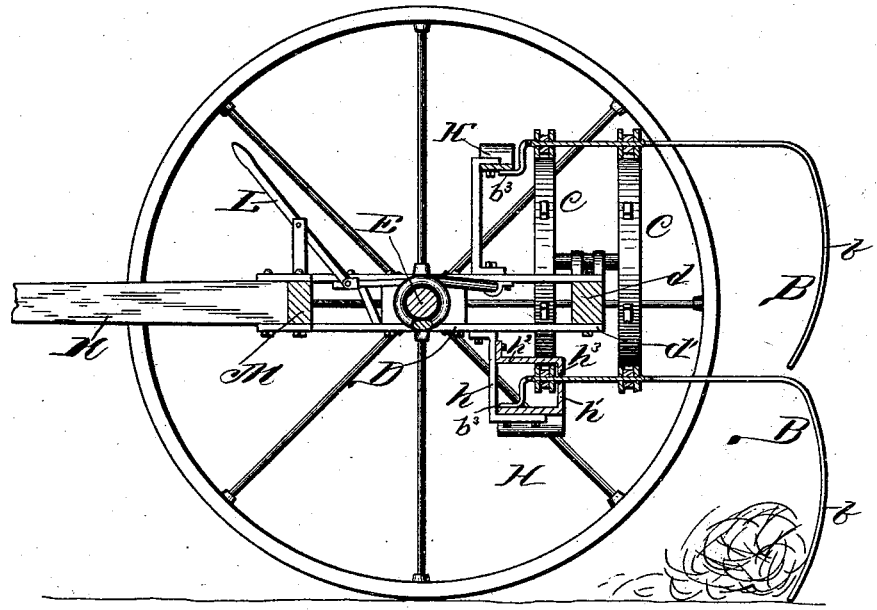
Figure 4:
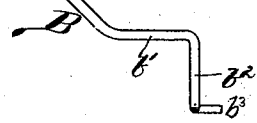
Figure 5:
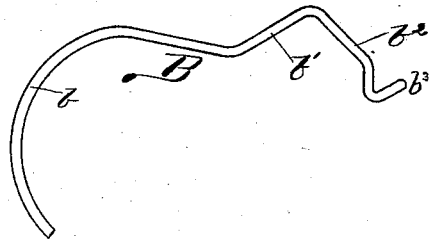
Figure 6:
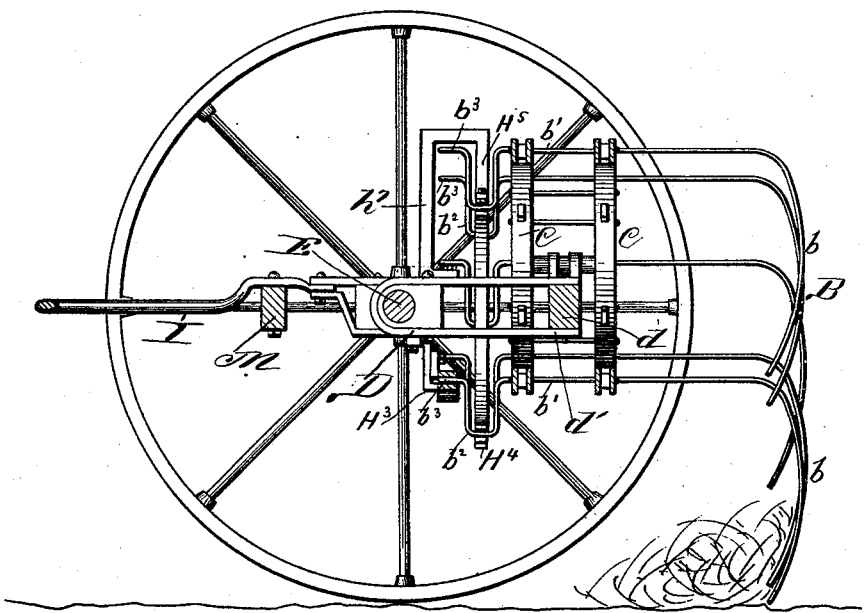
Figures 7, 8, 9:
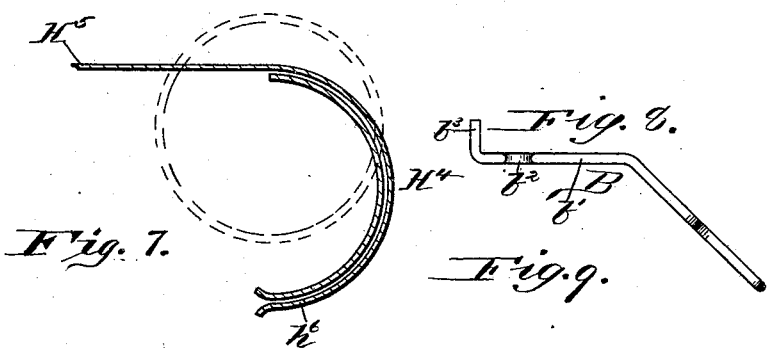

In the accompanying drawings, Figure 1 is a top plan view of a horse hay-rake embodying my invention, the upper guide hereinafter described for guiding certain bent shank portions of the teeth during their return travel being omitted, so as to more clearly illustrate said bent shank portions of the teeth. Fig. 2 represents the machine in rear elevation and illustrates a modification of the machine of Fig. 1 in that the shank portions of the teeth are understood to be somewhat differently bent and a somewhat different construction and arrangement of guides for the bent shank portions of the teeth employed, as hereinafter fully explained. Fig. 3 is a vertical section through Fig. 1 on a plane indicated by line $xx$ and parallel with the tongue or pole and between the main supporting-wheels of the machine on a larger scale. Fig. 4 is a top plan view of one of the teeth employed in Figs. 1 and 3. Fig. 5 shows said tooth in perspective. Fig. 6 is a vertical section taken through the modified construction in Fig. 2 on a plane indicated by line $yy$ and parallel with the pole and between the two wheels, the plane of said section being between the pole and farthest wheel on a larger scale. Fig. 7 represents one of the end guides and a portion of the upper guide of the modified construction involved in Figs. 2 and 6. Fig. 8 is a top plan view of one of the teeth employed in Figs. 2 and 6. Fig. 9 shows said tooth in perspective. Fig. 10 represents in rear elevation a portion of the machine shown in Fig. 1, the chain and teeth being omitted, so as to illustrate the upper and lower guides for the shank portions of the teeth. Fig. 11 is a like view of the construction shown in Fig. 2 and illustrates the upper, lower, and end guides therein employed.

The endless carrier A for the rake-teeth B is arranged to travel transversely to the line of progression of the machine and can be of any suitable construction. Said carrier can also be supported upon any suitable or desired arrangement of rolls, pulleys, or sprockets on a supporting frame or body.

As herein shown, the endless carrier consists of a broad sprocket-chain adapted for engagement with supporting-sprockets C, arranged in pairs respectively at opposite sides of the machine. The sprockets C are arranged upon a tilting frame D, which is conveniently hung upon the two-wheeled axle E, it being understood that the tilting frame can be raised and lowered by any means, so that when the teeth are not in use they can be raised from the ground by lifting the frame, and also so that when necessary the driver can raise or depress the frame, so as to lift or lower the rake-teeth with reference to the character of the ground. The endless chain or carrier can be driven from one of the wheels or from the axle through the medium of any desired power-transmitting connection, a simple arrangement being to provide the axle with a bevel-gear F, controlled by a clutch F', and arranged to engage a bevel-gear G on the axle of a couple of the aforesaid sprockets C, it being understood that I may as a matter of course substitute a long sprocket or roll for each pair of sprockets C, or that single short sprockets could be used with other suitable or known forms of chains or link belts. A comparatively broad chain or carrier, is however, preferable, since it affords a more extended and hence steadier bearing for the upper shank ends of the spring-teeth. The spring-teeth are curved and arranged with their curved portions in vertical parallel planes oblique or diagonal to the line of progression of the machine as a whole, and hence may be described as being arranged oblique or diagonal to the line of draft. The carrier is arranged transversely to the line of draft, and hence during the advancement of the machine the teeth will rake in lines oblique to the line of draft as a result of the compound movement produced by simultaneously moving them toward one side of the machine independently of the same and carrying them forward by reason of the general advancement of the machine. By such arrangement the teeth will rake in lines coincident with the vertical planes in which their curved portions are arranged, and hence will rake ahead and draw properly on the hay. With reference to such arrangement on the part of the rake-teeth I do not confine myself to any particular construction of carrier for the teeth, but may use any known or suitable construction, and also I may use any means suitable for supporting and operating the carrier.

Referring now to Figs. 1, 3, 4, 5, and 10, each tooth has a curved rear portion $b$, which is maintained in a vertical plane oblique to the line of progression of the machine, and hence oblique to the transversely-arranged endless carrier A. Each of said teeth is also provided with a stem or shank having a straight portion $b'$, which is pivotally supported by the endless carrier. The weight of the curved portions of these teeth will tend to cause them to hang in inclined planes, and hence to maintain such curved portions of the teeth in vertical or substantially-vertical planes I provide certain guides, arranged, as hereinafter described, so as to be engaged by certain bent shank portions of the stems of the teeth, whereby the curved portions of the teeth will be maintained in vertical planes not only during the forward-and-back travel of the teeth, but also while their respective shank portions are being carried about the sprockets, it being understood that during such periods there will be a relative turning action between the straight shank portions $b'$ of the teeth and the bearings therefor in or on the endless carrier, and hence that during such times as the shank portions of the teeth are being carried about the sprockets the curved portions of the teeth can hang in vertical planes, while (more strictly speaking) the bearings for the shanks or stems of the teeth are turning. In order, however, to insure proper position on the part of the curved portions of the teeth while raking, I bend the forward end portions of the stems or shanks of the teeth, so as to provide them with crank portions $b^2$, and support below the lower leaf of the endless carrier a guide H, consisting of a bar arranged transversely across the machine. The crank portions $b^2$ of such of the teeth as may be raking will bear upon and ride along said guide H, which latter will therefore prevent the pivotally-supported shank portions $b'$ of the teeth from turning, and hence will steady the teeth and maintain their curved portions in vertical planes oblique to the line of progression of the machine. The guide H is supported from the tilting frame D by hangers $h$, and is desirably provided with an upturned rear edge portion $h'$, arranged as a guide for preventing the chain or endless carrier from being drawn back and off from the sprockets. I may also supplement this guide portion $h'$ by a guide-bar $h^2$, arranged over the guide H, and having a downwardly-turned rear edge portion $h^3$, which corresponds in function with said guide portion $h'$. I also support upon the frame D an upper guide H', with which the crank portions of the teeth can engage during their back travel. I also provide end guides, so as to permit the shank portions of the teeth to be in continuous engagement with a guide or guideway. An arrangement of such nature is illustrated by Figs. 2, 6, 7, and 11, and also further explained by Figs. 8 and 9, respectively, illustrating a tooth having its shank bent with reference to a practically continuous guide. In said figures the teeth B have straight shank portions $b'$, which are pivotally supported by the endless carrier, as described in connection with the teeth shown in other figures. Said teeth have, however, their shank portions provided with U-bends $b^2$ and terminal shank portions $b^3$, which are deflected laterally to their straight shank portions $b'$, as best illustrated in Figs. 8 and 9. The terminal shank portions $b^3$ of the teeth traverse a horizontal lower guideway H³ while the teeth are raking, while on the other hand the U-shaped bent portions b² engage end guides H⁴ during the travel of the stems or shanks over or about the sprockets, and also engage an upper guide H⁵ while traveling from between the upper portions of said sprockets. The lower guide or guideway H³ is formed by a space between two bars h⁴, which are arranged transversely across the machine and attached to the frame D by brackets h⁵. The end guides H⁴ are each formed by two curved bars bent to form part circles and arranged concentric with one another, being held apart so as to leave a part-circular guideway between them. These part-circular guideways are eccentric to the axles of the sprockets, as best indicated in Fig. 7, wherein one of the sprockets is partially indicated in dotted lines. When a tooth reaches the limit of its raking position, its shank end b³ will leave the lower guide H³ and its bent shank portion b² will engage in one of the end guides H⁴, so as to travel between the two curved bars, between which such guideway is formed. The position of this guideway relative to the sprocket to which it is allotted will prevent the bent shank portion b² of the tooth from swinging up in either direction and will maintain the tooth in proper relative position until said bent portion b² of the stem or shank of the tooth leaves the curved guideway and engages under the straight horizontal upper guide H⁵, which is in the nature of a continuation of the outer curved bars h⁶ of the end guides H⁴. The guide H⁵ is supported by brackets h⁷ on the frame d, and the inner curved bars h⁸ of the end guides are also supported from the said frame by suitable brackets. The one of said end guides which is at the delivery side of the machine maintains the teeth in proper relative position while said teeth are rising at the delivery side of the machine, and on the other hand the end guide at the opposite side of the machine serves to engage the bent shank portions b² of the teeth which are being lowered into raking position and directs their terminal portions b³ into the lower guide H³.

The frame of the machine can be made as an exceedingly simple, economical, and convenient structure, and in this connection it will be observed that the general construction and arrangement herein shown involves the desirable elements of simplicity, economy, practical convenience, and general efficiency. Thus the space forward of the two-wheeled axle can be used simply as room for the hounds I and rear portion of a tongue or pole K or for shafts where the rake is designed for one horse. The carrier-frame can comprise simply a bar d, supported from the axle by arms d' and provided with bearings for the sprocket-wheels, and the guide H can be attached to the arms d' by brackets h, Fig. 3. The bar or frame D is arranged just in rear of and parallel with the axle and can be raised and lowered by a lever L, pivoted on a cross-bar M and suitably connected with the tilting frame D.

I am aware that it has heretofore been proposed to provide horse hay-rakes with endless carriers equipped with rake-teeth. Thus in one instance it has been proposed to provide a transversely-positioned carrier arranged across the machine in rear of the axle and parallel therewith, as in Patent No. 431,171; but in such case the curved teeth are set with their curved portions in parallel angles to the line of draft and coincident with the line of travel of the endless carrier, whereby while the teeth will be carried diagonally forward during the advancement of the machine the pull of each tooth upon the material being raked will be oblique to the plane occupied by the curved portion of the tooth. The same may be said of Patent No. 94,782, and as another way it is proposed in Patent No. 395,132 to provide two carriers arranged oblique to the line of draft and ahead of the axle and to rake the hay backward and deliver the same toward the center line of the machine as the latter advances in contradistinction to my improved arrangement, under which the carrier is positioned transversely across the machine and the teeth arranged and operated to rake diagonally forward and deliver at the side of the machine, and in thus raking diagonally forward draw against the material which is being raked in lines coincident with the planes in which their curved portions are held while raking.

What I claim as my invention is—

1. A hay-rake comprising a transversely-positioned endless rake-tooth carrier arranged across the machine and operated for side delivery and a set of curved rake-teeth attached to the endless carrier and supported to set while raking with their curved portions in planes oblique both to the line of progression of the machine and to the line of travel of the endless carrier toward one side of the machine, the teeth engaged in raking being carried diagonally forward and maintained to respectively exert upon the material being raked a forward pull in a direction coincident with the plane occupied by the curved portion of the tooth, substantially as described.

2. A hay-rake comprising a tilting frame arranged in rear of and supported by the wheeled axle, an endless carrier supported upon the tilting frame and arranged parallel with the axle, so as to travel from side to side of the machine, a set of curved rake-teeth attached to the endless carrier and supported to set while raking with their curved portions in planes oblique both to the line of progression of the machine and to the line of travel of the endless carrier, substantially as described.

3. The combination, in a hay-rake, of the endless transversely-positioned carrier arranged across the machine and the curved rake-teeth attached to the carrier so as to set while raking with their curved portions in planes oblique both to the line of progression of the machine and to the line of travel of their endless carrier and having horizontal stems or shanks which are arranged transversely to and pivotally supported by the endless carrier, substantially as described.

ERNEST SWIFT.

Witnesses:
GEORGE A. HARVEY,
FRANK W. PATTEN.